(12) United States Patent
Martens et al.

(10) Patent No.: US 8,416,129 B2
(45) Date of Patent: Apr. 9, 2013

(54) POSITIONING DETERMINATIONS OF RECEIVERS

(75) Inventors: Christopher J. Martens, Berkeley, MO (US); Gregory M. Gutt, Leesburg, VA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 12/699,679

(22) Filed: Feb. 3, 2010

(65) Prior Publication Data

US 2010/0265128 A1 Oct. 21, 2010

Related U.S. Application Data

(60) Provisional application No. 61/171,009, filed on Apr. 20, 2009, provisional application No. 61/177,579, filed on May 12, 2009.

(51) Int. Cl.
*G01S 19/38* (2010.01)
*G01S 19/42* (2010.01)

(52) U.S. Cl. .............................. 342/357.21; 342/357.25

(58) Field of Classification Search .............. 342/357.21, 342/357.25, 357.63, 451, 457; 701/408, 701/412
See application file for complete search history.

(56) References Cited

U.S. PATENT DOCUMENTS

| 6,181,275 | B1 | 1/2001 | Chenebault |
| 2005/0114023 | A1* | 5/2005 | Williamson et al. .......... 701/214 |
| 2005/0156782 | A1 | 7/2005 | Whelan |

FOREIGN PATENT DOCUMENTS

EP 1744454 A2 1/2007

OTHER PUBLICATIONS

PCT International Preliminary Report on Patentability dated Oct. 25, 2011, for PCT/US2010/031649, filed Apr. 19, 2010, Applicant: The Boeing Company, Forms PCT/IB/373 and PCT/ISA/237 (8 pages).
PCT International Search Report and Written Opinion for PCT/US2010031649, Applicant: The Boeing Company, Forms PCT/ISA/210, 220 and 237 dated Mar. 9, 2010 (13 pages).
Zhang Lin et al., "Anti-Spoofing Extended Kalman Filter for Satellite Navigation Receiver", Wireless Communications, Networking and Mobile Computing, 2007. Wicom 2007. International Conference On, IEEE, Piscataway, NJ, USA, Sep. 21, 2007, pp. 996-999 (4 pages).
Karl Spingarn, "Passive Position Location Estimation Using the Extended Kalman Filter", IEEE Transactions on Aerospace and Electronic Systems, IEEE Service Center, Piscataway, NJ, US, vol. AES-10 No. 4, Jul. 1, 1987, pp. 558-567 (10 pages).

* cited by examiner

*Primary Examiner* — Dao Phan
(74) *Attorney, Agent, or Firm* — Vista IP Law Group LLP; Cynthia A. Dixon

(57) ABSTRACT

The disclosed method and system is used to determine the position of a user device. The user device can receive data signals and/or carrier signals from orbiting space vehicles. These data signals can be used for positioning calculation and/or track maintenance of the user device. The disclosed method and system can account for time and frequency biases of the user device. For the track maintenance, a Kalman filter state estimator can be extended to include a velocity of the user device.

12 Claims, 9 Drawing Sheets

POSITIONING DETERMINATIONS OF RECEIVERS

RELATED APPLICATION

This application claims the benefit of and priority to U.S. Provisional Application Ser. No. 61/171,009, filed Apr. 20, 2009, and U.S. Provisional Application Ser. No. 61/177,579, filed May 12, 2009, the contents of both of which are incorporated by reference herein in their entirety.

U.S. Pat. No. 7,489,926 issued to Whelan, et al. is hereby incorporated by reference in its entirety in order to more fully describe the state of the art as known to those skilled therein as of the date of the invention described herein.

FIELD

The present disclosure relates to satellite navigation and estimating the position of fixed or moving user devices.

BACKGROUND

Global Positioning Systems (GPS) are widely used to determine the position of a receiver on the earth. The receiver can use position and time data of GPS satellites to calculate its position. Sometimes, however, a GPS receiver or signal is not available, and an alternative method of satellite geolocation may be desirable. The unavailability of the GPS signal may be due several factors. These factors may include, but are not limited to, diminished signal strength in an occluded environment (e.g., buildings, heavy foliage, etc.), deliberate or incidental radio frequency interference, or hardware or software malfunctions resulting in degraded receiver performance.

SUMMARY

The present disclosure relates to a system, apparatus, and method of determining the position of a user device, such as an Iridium receiver, which contains a time bias and a frequency bias. The present disclosure also relates to a system, apparatus, and method of estimating the position and velocity of a user device in addition to estimating the time and frequency bias of that same device.

Some embodiments of the present disclosure provide a method for determining the position of a user device. The user device can receive signals from space vehicles. Based on correlation time and frequency deviation measurements derived from the received signals, the user device can calculate the current position. The signals may not include position information of the space vehicles in order for the user device to determine the current position. A short correlation time of the signals can be sufficient for accurate results.

One or more embodiments of the disclosure provide a method for track maintenance. Track maintenance is the process of estimating a position of a user device if data for positioning calculations becomes unavailable. The method can account for a time bias and a frequency bias. The method can employ an extended Kalman filter state estimator, which can include a velocity of the user device. In some embodiments, the velocity of the user device, time and frequency biases, and statistical errors can be accounted for using only information of latitude and longitude.

Some embodiments of the disclosure provide a user device capable of receiving signals from at least one space vehicle. The user device can sample the received signals in order to compute a correlation time and frequency deviation measurement. Based on these measurements, the user device can determine its position. If the user device does not receive signals from at least one space vehicle, the user device can estimate a position using an extended Kalman filter state estimator, which can include a velocity of the user device.

In one or more embodiments, the method for track maintenance of a user device includes receiving a signal from at least one space vehicle, and obtaining a position of the user device based on the received signal. In some embodiments, the method further includes applying an extended Kalman filter state estimator including the position of the user device and a velocity of the user device. In at least one embodiment, the method also includes obtaining an estimate of a state of the user device for the track maintenance.

In some embodiments, the obtaining of the position of the user device includes a snapshot calculation. In one or more embodiments, the performing of the snapshot calculation and/or the extended Kalman filter state estimator includes a pseudo range measurement model and a pseudo range rate measurement model. (The pseudo range rate is a function of the sum of the Doppler and the frequency deviations of the transmitters and/or the receivers.) In at least one embodiment, the computing of the pseudo range measurement model and the pseudo range rate measurement model includes a nonlinear least squares method.

In one or more embodiments, the performing of the snapshot calculation and/or the extended Kalman filter state estimator includes a time bias and a frequency bias. In some embodiments, the computing of the time bias and the frequency bias includes a linear least squares method. In at least one embodiment, the computing of the time bias includes approximating the time bias with a polynomial. In some embodiments, the computing of the frequency bias includes taking the derivative of the time bias with respect to time. In one or more embodiments, the time bias and the frequency bias are expressed as explicit functions of a position of the user device. In at least one embodiment, expressions of the time bias and the frequency bias modify a nonlinear least squares cost function by removing the biases as independent states, thereby reducing the number of independent variables to those of a position of the user device alone.

In some embodiments, the signal is received from a low earth orbit (LEO) satellite. In one or more embodiments, the LEO satellite is part of the Iridium system. In at least one embodiment, the state of the user device includes a position of the user device, a velocity of the user device, a time bias, and a frequency bias. In one or more embodiments, obtaining the estimate of the state of the user device includes evaluating a latitude and a longitude of the position of the user device.

In one or more embodiments, the method for positioning calculations in an occluded environment includes receiving signals from at least one space vehicle, and computing a pseudo range and a pseudo range rate including a time bias and a frequency bias of the signals. In some embodiments, the method further comprises minimizing a cost function including the pseudo range and the pseudo range rate to obtain a position. In at least one embodiment, the cost function includes a product of the pseudo range and the pseudo range rate. In some embodiments, the computing of the pseudo range and the pseudo range rate includes a nonlinear least squares method.

In some embodiments, the computing of the time bias and the frequency bias includes a linear least squares method. In one or more embodiments, the time bias and the frequency bias are expressed as explicit functions of a position of the user device. In at least one embodiment, expressions of the time bias and the frequency bias modify a cost function by removing the biases as independent states, thereby reducing the number of independent variables to those of a position of the user device alone.

In one or more embodiments, the signal is received from a LEO satellite. In some embodiments, the LEO satellite is part of the Iridium system. In at least one embodiment, the occluded environment includes an indoor environment, a jamming environment, and/or other environment where the signal is degraded by incidental or deliberate radio frequency interference. In some embodiments, the obtaining of the position of the user device is based on latitude and longitude information.

In one or more embodiments, the user device includes an antenna capable of receiving signals from at least one space vehicle. In some embodiments, the user device further includes a computer system capable of processing the received signals to calculate a time bias and a frequency bias, the computer system using the time bias and the frequency bias to determine a position of the user device. In at least one embodiment, the computer system can execute an extended Kalman filter state estimator including a velocity of the user device in order to estimate a position of the user device if the antenna does not receive the signals of the at least one space vehicle. In some embodiments, the computer system further comprises an output device.

DRAWINGS

These and other features, aspects, and advantages of the present disclosure will become better understood with regard to the following description, appended claims, and accompanying drawings where:

DESCRIPTION

A system, apparatus, and method are disclosed for determining the position of a user device, such as an Iridium receiver, which contains a time bias and a frequency bias. Additionally, a system, apparatus, and method are disclosed that allow for estimating the position and velocity of a user device in addition to estimating the time and frequency bias of that same device.

Discussion of Prior Art

One important example of a prior art method for estimating a precise position of a user device from signals from a low-earth orbit (LEO) satellite is discussed in detail as follows. This method is disclosed in U.S. Pat. No. 7,489,926, issued to Whelan, et al. FIGS. 1 through 5 provide a thorough understanding of the various embodiments of this prior art method taught in Whelan, et al.

By way of overview, this prior art method for estimating a precise position of a user device from signals from a low earth orbit (LEO) satellite includes receiving at least one carrier signal at a user device, where each carrier signal is being transmitted from a distinct LEO satellite. The user device processes the carrier signals to obtain a first carrier phase information. Then, the user device recalls an inertial position fix derived at an inertial reference unit. Finally, the user device derives a position of the user device based on the inertial position fix and the first carrier phase information.

Figure 1:
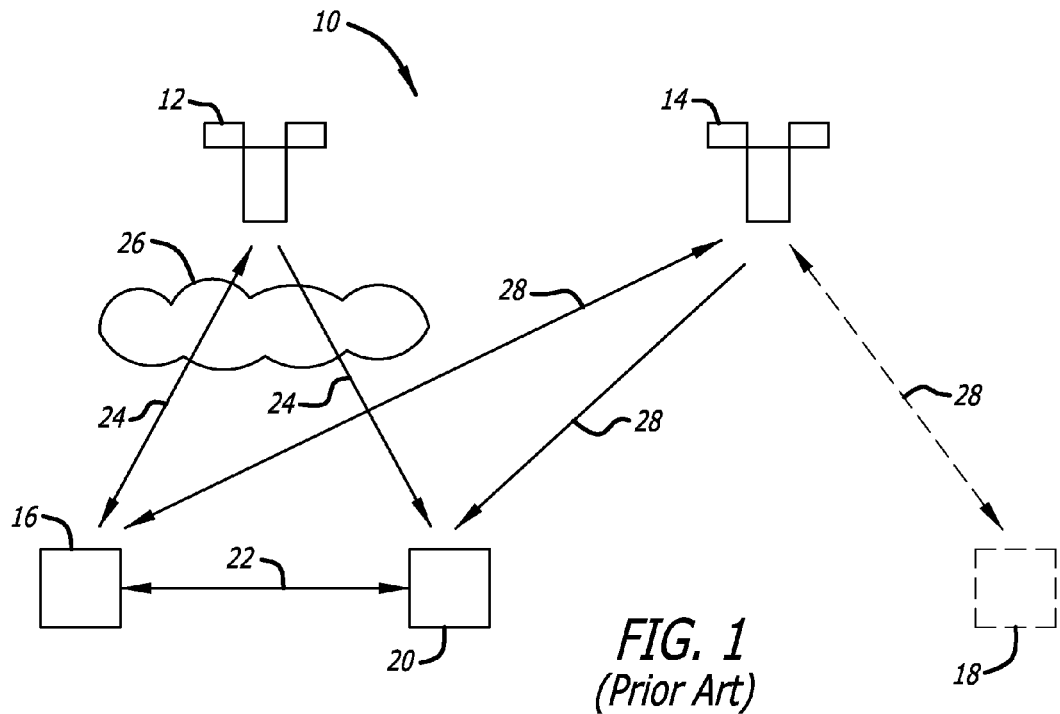
FIG. 1 is a prior art block diagram of an indoor positioning system using LEO satellites.

FIG. 1 illustrates a system in which Iridium (or other LEO) satellites 12, 14 are used to provide ranging systems to a user in conjunction with one or more reference stations 16, 18. One of the advantages of using Iridium is that it is able to produce a signal that is much stronger than that produced by GPS satellites. Depending on circumstances, the Iridium satellite can be configured to provide users with approximately 20 dB to 40 dB or more received power than GPS.

Positioning using a single ranging source in a three-dimensional dynamic environment with Iridium differs significantly from previous positioning systems in that single ranging sources have been limited to two-dimensioned (2D) resolution on an idealized surface. With the Navy Navigation Satellite System known as TRANSIT, for example, the user was only able to make quasi-static, two-dimensional measurements that were limited in accuracy. Normally, a minimum of four operational TRANSIT satellites were needed to provide the required frequency of precise navigation fixes.

GPS now provides at least four ranging sources simultaneously in order to enable instantaneous, three-dimensional (3D) positioning. However, GPS has a low-power signal that limits operations indoors or in conditions of heavy jamming. A fundamental advantage of the system is that it simultaneously addresses the limitations of its predecessors, providing dynamic, three-dimensional, accurate position fixes, even indoors or in the presence of jamming. Augmented positioning using Iridium should be able to achieve suitable performance that is limited principally by the effects of ambient multipath.

A ground support infrastructure is used to provide differential reference measurements. In the present embodiment, a reference station 16 receives signals from satellites 12 and 14 using reference equipment. Such reference equipment can be functionally identical to user equipment 20 differing only in that the local position of a receiving antenna is precisely known by a survey or other conventional means including GPS positioning.

Differential reference measurement involves the cooperation of at least two receivers, the reference station 16, and the user equipment 20. The cooperation of at least two receivers relies upon a signal 24 received at both the reference station 16 and the user equipment 20, which are both degraded by virtually the same errors. The cooperation is possible on earth when the signals pass through virtually the same slice of atmosphere containing the same obstructions to signals 26. To occur on the surface of the earth, the user equipment 20 and the reference station 16, generally, can be separated by fewer than approximately a thousand kilometers. Where such geometry is present, the signal 24 that reaches both of the user equipment 20 and the reference station 16 will have traveled through the same obstacles 26 or will be augmented by the same pattern of jamming.

The reference station 16 provides real-time measurements of the Iridium clock. A data message 22, which, in the present embodiment, is transmitted over Iridium from the reference station 16 to the user receiver 20, provides a real-time range correction to each measurement to account for both Iridium clock errors and atmospheric effects including obstacles 26 or jamming. Since the reference station 16 has no way of knowing which of the many available satellites the user receiver 20 might be using to calculate its position, the reference receiver 16 quickly runs through all the visible satellites, such as satellite 14, and then computes the error attendant to its signal 28. The corrections necessary to bring the calculated result into line with the known local position of the reference station are then transmitted on any suitable band with adequate confidence in the jamming environment to the user equipment in association with time references to establish near real time correction. In general, navigation performance degrades as the separation between user and reference station gets greater due to attendant differences in obstacles 26 or jamming the signal 24 experiences.

Where a second reference station 18 is suitably close, the second reference station 18 can perform the same calculations on the signal 28 as the first reference station 16 yielding a second correction factor from, for instance, the satellite 14, thereby allowing the user equipment to achieve greater precision by averaging or other suitable means of harmonizing the error calculation.

Figure 2:
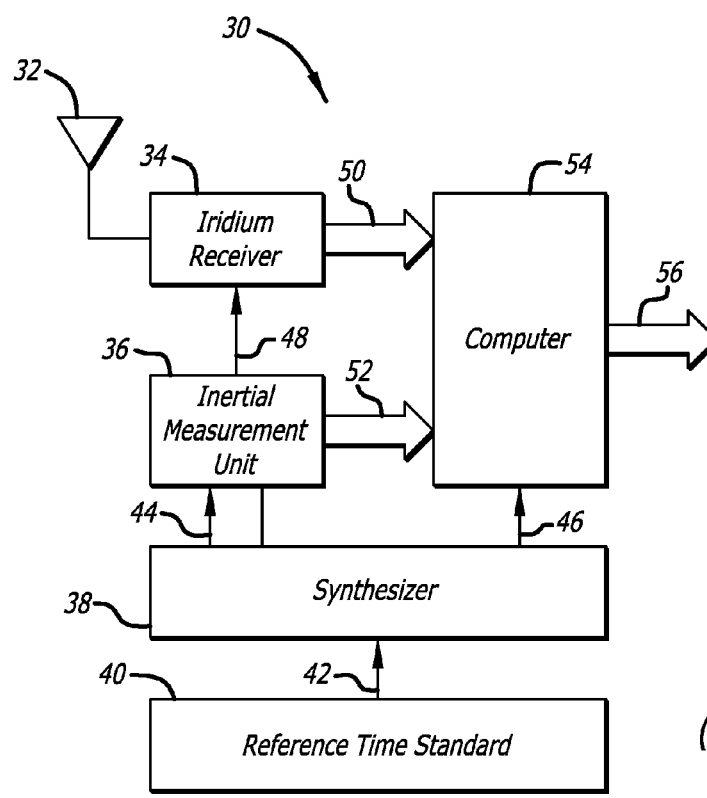
FIG. 2 is a prior art diagram of a differential positioning system using LEO satellites.

FIG. 2 depicts a block diagram for the present system architecture for a positioning system 30 that uses Iridium or other LEO satellites. Each component of the positioning system 30 is driven from the same master clock, which is a precise time standard 40. A synthesizer 38 creates each of the requisite coherent sine wave and clock signals for each component based upon a clock signal that is fed to the synthesizer 38 from the precise time standard 40 through a data bus 42.

An antenna 32 is configured to receive transmissions from the Iridium or other LEO satellites as the present embodiment is configured and is optimized for L band reception. An Iridium receiver 34 receives a raw signal that is received at the antenna 32 and compares it with the signal generated by the synthesizer 38 and presented to the receiver 34 at a data bus 48. By comparing the signal at the data bus 48 with the transmission received at the antenna 32, the Iridium receiver 34 presents data sufficient to compute a position solution.

An augmented position solution is calculated using an inertial measurement unit 36 that receives a clock signal from the synthesizer 38. Measuring acceleration with the inertial measurement unit 36 in the present embodiment is accomplished by accelerometers oriented in three orthogonal axes and measuring angular rate about each such axis to compute attitude accurately relative to a vertical axis accomplish accurate attitude sensing. Attitude and other parameters or orientation and motion of the user are derived from the data produced by the accelerometers and rate sensors within the common assembly. In the presently preferred embodiment, the accelerometers are MEMS inertial sensors.

Measuring acceleration with the inertial measurement unit 36 in the present embodiment augments the system to provide a system that anticipates the next position of the user. Optionally, the position solutions derived by use of the inertial measurement unit 36 may be harmonized with earlier solutions to gain a self-testing ability and to reduce a radius of error in the calculation of the position with the inertial measurement unit 36.

Three-dimensional positioning and filtering using Iridium operates over time scales of about 10 minutes, which is much less than the 84-minute Schuler period. The Schuler period is the period for a simple undamped pendulum with a length equivalent to the radius of the earth, and has been used to correct traditional inertial navigation equipment for the curved movement of a spot on the surface of the earth. Therefore, the inertial unit needs to be capable of providing relative position measurements whose accuracy is significantly better than the filtered range measurement accuracy of the Iridium signal.

With MEMS inertial sensors of sufficient performance, degradation due to the ambient multipath of an indoor environment will dominate the overall system-level accuracy. The total system accuracy will start out in the 4-meter range representing one sigma in standard deviation. Advanced signal processing techniques applied to the Iridium signal significantly reduce indoor multipath error. In outdoor applications with an unobstructed view of the sky, the accuracy will be considerably better, which is limited mostly by the performance of the inertial reference unit.

In at least one embodiment, the method and apparatus create a Secure Iridium Broadcast Signal. Although the Iridium signal is technically a TDMA signal, the superposition of several sub-bands together formulate a high-powered signal to appear more like a secure CDMA signal. With such a formulation, a navigation user knows the code in advance to be able to make use of it. If the pulse patterns that make up the secure Iridium Broadcast Signal are programmed correctly, the high-power signal would appear like the secure Y-code signal of GPS or its equivalent for processing.

The systems architecture for the indoor case driven by multipath imposes an implicit requirement on the total position bias of about 1 meter after 10 minutes of coasting. The limiting inertial parameter is likely to come from the gyro-rate bias stability or angle random-walk error. A higher performance inertial system is required if the system is to be used outdoors for high-accuracy and integrity navigation.

The computer 54 serves to tie all the Iridium ranging measurements together, especially when there is only a single ranging source in view at any given time. "High accuracy" means position errors at the centimeter level. "High integrity" is a safety related term that means that there is enough redundant information present in the form of excess satellite ranging measurements to determine if there is an error in the positioning system. Such capability can be used to alert an operator of the system when that system should not be used for navigation. High performance navigation employs the carrier phase of the LEO satellite to attain raw range measurements precise to the centimeter level.

Because the system will often be measuring only one ranging source at a time, it is desirable that a precise frequency standard be used. Two types of frequency standards are available for this purpose: an ovenized quartz crystal oscillator and an atomic rubidium frequency standard. An ovenized quartz crystal as long as the Allan variance at 600 seconds (10 minutes) does not exceed $10^{-11}$. This corresponds to about 2 meters of position error over the Iridium pass, which is significantly less than the multipath error on the Iridium signal. If additional accuracy is needed, a compact, ruggedized rubidium standard should be used. The corresponding Allan variance is $10^{-13}$, corresponding to a position error of about 2 cm over the 10-minute interval.

Raw position solutions from the Iridium receiver 34 through a data bus 50 and acceleration measurements from the inertial measurement unit 36 through a data bus 52 are fed into a computer 54 which executes a Kalman filter to process the measurements into final solutions. The Kalman filter is a set of mathematical equations that provides an efficient computational (recursive) solution of the least-squares method. The filter is very powerful in several aspects: it supports estimations of past, present, and even future states, and it can do so even when the precise nature of the modeled system is unknown.

The Kalman filter estimates a process by using a form of feedback control: the filter estimates the process state at some time and then obtains feedback in the form of (noisy) measurements. As such, the equations for the Kalman filter fall into two groups: time update equations and measurement update equations. The time update equations are responsible for projecting forward (in time) the current state and error covariance estimates, which are used to obtain the a priori estimates for the next time step. The measurement update equations are responsible for the feedback, i.e. for incorporating a new measurement into the a priori estimate in order to obtain an improved a posteriori estimate.

Figure 4:
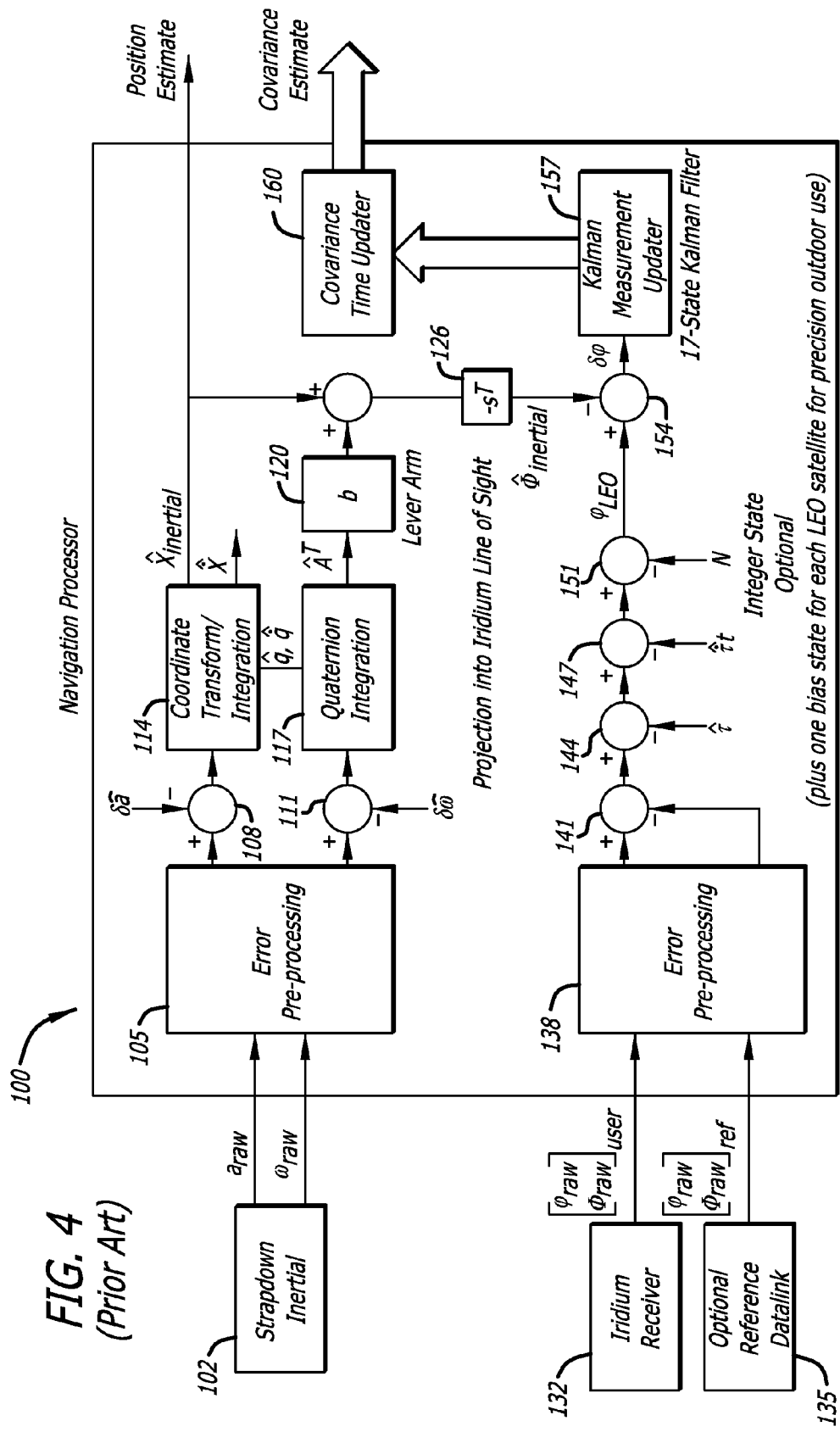
FIG. 4 is a prior art block diagram of a tightly coupled LEO inertial integrator.

Since raw position solutions from the Iridium receiver 34 through a data bus 50 and acceleration measurements from the inertial measurement unit 36 through a data bus 52 that are fed into the computer 54 are measurements of the same phenomenon (i.e. movement in space), the measurements are related in the system modeled by the Kalman filter 157 (FIG. 4).

Depending on the circumstances, not all states (such as yaw attitude) will necessarily be observable at all times. However, because of the orbit geometry of Iridium, the system design ensures that the position component of output will effectively always be observable to within the accuracy of the Iridium ranging measurements.

Figure 3A:
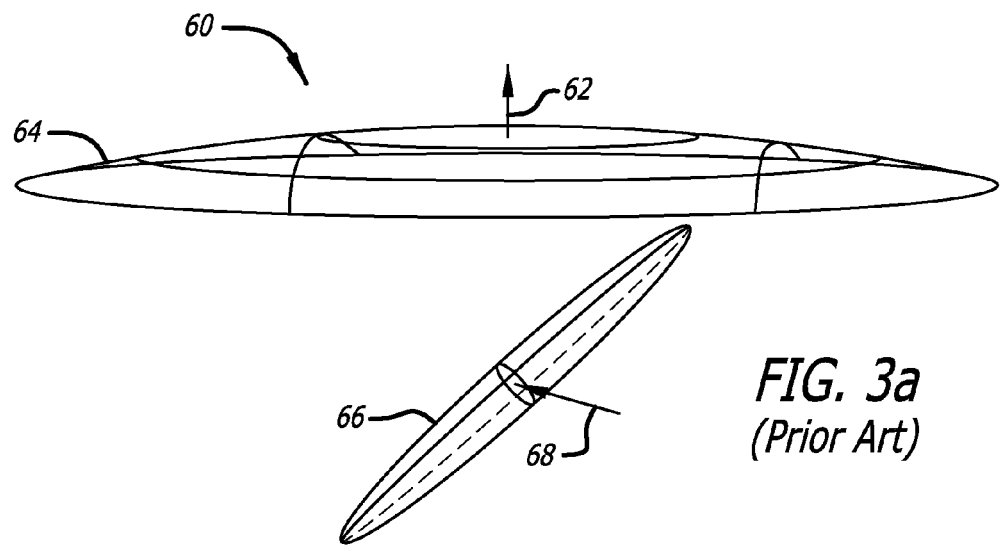
FIG. 3a is a prior art graphic representation of a system covariance from LEO and MEMS sources after a first pass.
Figure 3B:
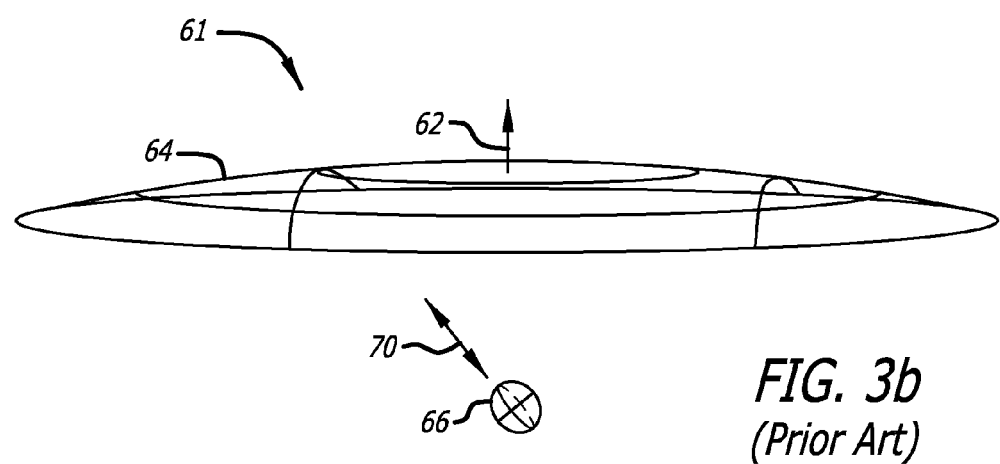
FIG. 3b is a prior art graphic representation of a system covariance from LEO and MEMS sources after subsequent passes.

There are two fundamental modes of operation of this system. The first is based on code phase measurements. Inside of a building, there are many sources of multipath; so using the carrier is not especially feasible. However, LEO satellites provide an abundance of geometry, as shown in FIG. 3, along with significantly higher broadcast power that is useful for penetrating physical barriers. The code ranging measurements can be combined using this geometry to solve for reasonably accurate position, using the inertial navigation unit to bridge measurements made at different times.

The second mode of operation is based on carrier phase measurements. If carrier phase measurements are made outdoors, it is possible to obtain a clean line of sight to the LEO satellites, and therefore, achieve centimeter-level positioning accuracy. The same abundance of geometry, as shown in FIG. 3, enables these precision measurements to be combined into high accuracy and high integrity position solutions, thereby again using the inertial navigation unit to bridge measurements made at different times.

FIG. 3 shows a typical geometry pass from the standpoint of the user. The Iridium satellites fly in an arc over an interval of several minutes. Multipath will generally be the largest error source. The Iridium carrier phase can be used to drive the ranging error to be arbitrarily small—potentially to centimeter level—when the user has a clear view of the sky. Unfortunately, raw ranging errors will tend to increase to roughly 20-30 m working indoors. Because the Iridium satellite spans a large-angle arc in the sky, it should be possible to take advantage of the spatial diversity in order to average down much of this indoor multipath error. By analogy with experimental GPS performance, it is possible to predict what Iridium performance is likely to be by scaling the parameters. The correlation of time between Iridium measurements is estimated to be about 10 seconds; meaning that over a 10-minute pass, the receiver can gather roughly 60 "independent" measurements. Therefore, the ranging accuracy may perhaps be improved to roughly 4 meters (dividing the raw ranging accuracy by the square root of 60).

As shown in FIG. 3, a cold start initialization 60 uses a trajectory of the first Iridium satellite pass to define a local section of the Iridium orbit sphere 64 having a zenith 62 relative to the position of the user 68. Inertial navigation by the inertial measurement unit 36 yields a positional covariance after the first pass 66 as shown relative to the position of the user 68. The rapidly changing angle of the orbit of the LEO satellite in the LEO satellite orbit sphere 64 allows for a rapid convergence of the position estimate allowable by means of the LEO satellite in its orbit sphere 64.

The system structure resembles a tightly coupled GPS-Inertial unit. However, as shown in FIG. 4, the system 100 is intended to process as few as a single range measurement at a time using a Kalman filter 150. For dynamic applications, a MEMS Inertial Reference Unit (IRU) 102 is coupled to the system and subjected to error preprocessing in the error-preprocessing unit 105. In more demanding applications, an inertial-grade IRU may be desirable.

A general model for a suitable IRU 102 includes a strap down inertial navigation system. Strap down inertial navigation systems are rigidly fixed to the moving body. Therefore, strap down inertial reference units move with the body, thereby their gyros experience and measure the same changes in angular rate as the body in motion. The strap down inertial reference unit contains accelerometers to measure changes in linear rate in terms of the body's fixed axes. The body's fixed axes serve as a moving frame of reference as opposed to the constant inertial frame of reference. The navigation computer uses the gyros' angular information and the accelerometers' linear information to calculate the body's 3D motion with respect to an inertial frame of reference.

The IRU 102 senses inertial acceleration, which it outputs as rotational acceleration. The rotational acceleration vector information is fed into an error preprocessor 105. The inertial error preprocessor 105 corrects pre-calibrated parameters, including scale factor and alignment errors. Next, the corrected measurements pass through the time update blocks 108 and 111, including the addition of the accelerometer and gyro bias states and the integration of the strap down IRU 102 measurements into position, velocity, and attitude vectors.

At an in-phase coordinate processor 114 and a quatrature coordinate processor 117, a vector translation, $x_f$, and attitude motion, represented by the 3×3 attitude rotation matrix A, of the user platform. With prior knowledge of the antenna mounting lever arm b 120, with respect to the body frame of the user platform, it is possible to use the inertial signal output from the in-phase coordinate processor 114 and the quatrature coordinate processor 117 to project the antenna motion into the line of sight of the satellite, ŝ at a processor 126. The output of the processor 126 is a complex, real-time phase correction. The phase correction is to subtract out short-term user motion and enable long integration times on a LEO signal, when such a LEO signal is available.

On the LEO receiver side of a LEO (in the case of the present embodiment, an IRIDIUM) receiver 132 receives a carrier signal from the LEO satellite. In a present embodiment, a second carrier signal received at a reference groundstation in proximity to the user device is also received in association with the precise position of the ground-station position at an optional data link 135. The second carrier signal insures a rapid integration of the carrier signal from the LEO satellite and further enables operation of an LEO error preprocessor 138.

As with the inertial side, the LEO error preprocessor 138 corrects pre-calibrated parameters, including scale factor and alignment errors. Additionally, the LEO error preprocessor 138 corrects propagation-induced errors based upon the information received at the optional data link 135. The error processor 138 applies corrections such as for atmospheric/ionospheric effects, time tag alignments, and blending code and carrier.

Bias state time update blocks 141, 144, 147, and 151 apply the scalar receiver clock and clock bias estimates to the raw measurements. A further bias block 154, uses the output of the processor 126 to subtract out short-term user motion and enable long integration times on a LEO signal, when such a LEO signal is available. The corrected LEO position is ready for feeding into the Kalman filter 157. In the present embodiment, the computer 54 executes a 17-state Kalman filter estimator to solve for: position (3 axes), velocity (3 axes), accelerometer bias (3 axes), attitude (3 axes), gyro bias (3 axes), clock bias, and clock drift.

A covariance time updater 160 propagates a state covariance estimate. The estimated inertial position, which is projected into the line of sight of each given LEO satellite by the processor 126, is compared with the measured range to the LEO satellite to form the measurement update to the Kalman filter 157.

Figure 5:
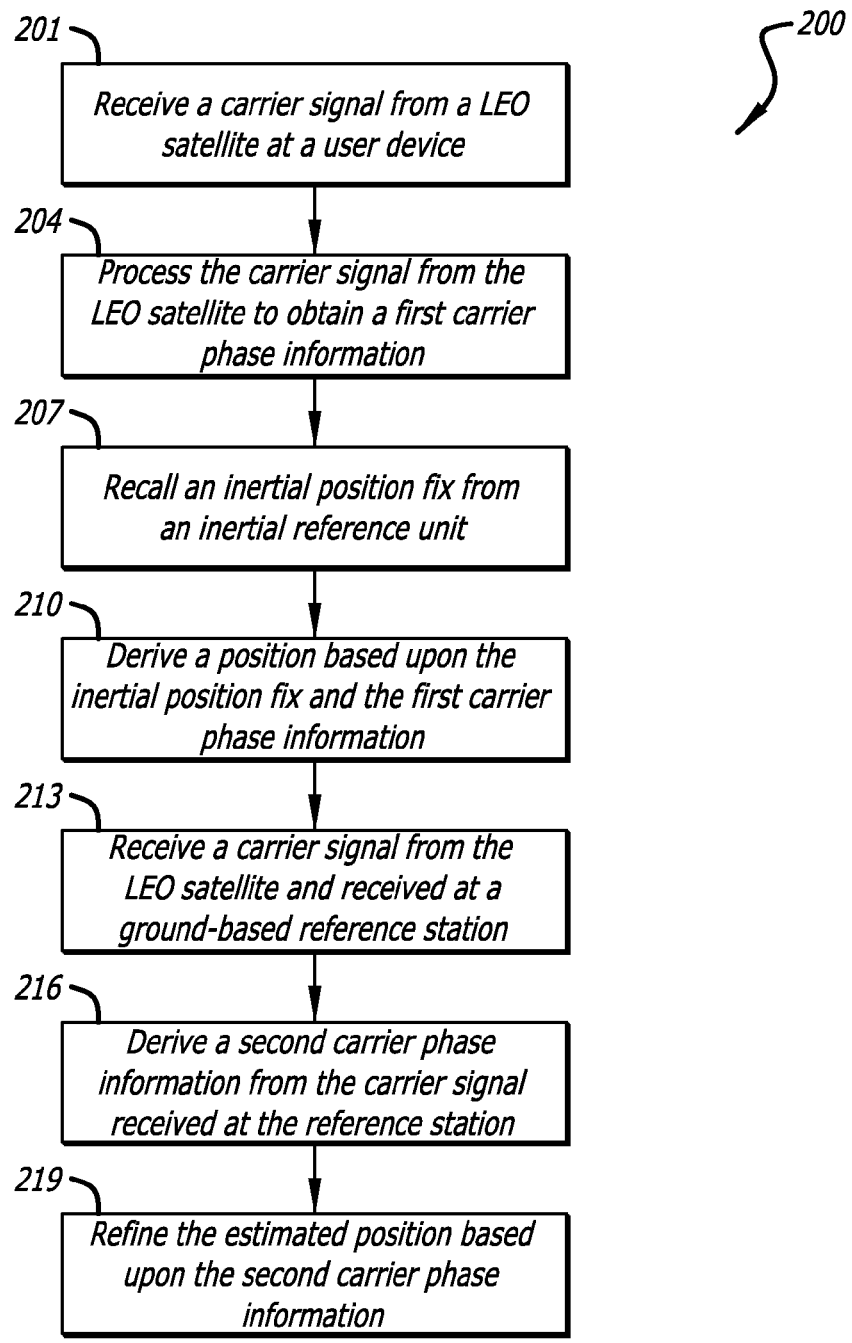
FIG. 5 is a prior art flowchart to describe a process for deriving a position based upon a LEO signal and an inertial position fix.

Referring to FIG. 5, a method 200 is provided for estimating a precise position of a user device in a satellite-based navigation system. At a block 201, a user device receives transmitted carrier signals from a set of LEO satellites. At a block 204, the user device processes the carrier signals to obtain user carrier phase information including geometrically diverse user carrier phase information from the set of LEO satellites. At a block 207, the user device recalls an inertial position fix. At a block 210, the precise position of the user device is determined based on the inertial position fix and the user carrier phase information. At a block 213, the user device derives user carrier information from the set of LEO satellites based upon the inertial position to resolve integer cycle ambiguities in the user carrier phase information.

In a preferred embodiment, the method 200 includes tracking the carrier signals at a reference station in order to obtain reference carrier phase information. The reference carrier phase information includes geometrically diverse reference carrier phase information from the set of LEO satellites. At a block 216, the user device refines the accuracy of the position calculation based upon the reference carrier phase information. In a preferred embodiment, the method further comprises estimating an approximate user position and clock offset using code phase signals received from a set of navigational satellites.

Preferably, differential code phase techniques are used to improve the accuracy of the initial estimate. The preferred embodiment of the method also includes additional advantageous techniques such as: compensating for frequency dependent phase delay differences between carrier signals in user and reference receiver circuits, reading navigation carrier information and LEO carrier information within a predetermined time interval selected in dependence upon an expected motion of the user receiver and the LEO signal sources, calibrating LEO oscillator instabilities using navigation satellite information, compensating for phase disturbances resulting from a bent pipe LEO communication architecture, compensating for oscillator instabilities in the user and reference receivers, predicting present reference carrier phase information based on past reference carrier phase information, and monitoring the integrity of the position calculation.

Depending on the circumstances, not all states (such as yaw attitude) will necessarily be observable at all times. Because of the orbit geometry of Iridium—specifically the rapid large-angle overhead motion—the system ensures that, upon convergence, the position component of output will effectively always be observable to within the accuracy of the Iridium ranging measurements. If high-performance carrier ranging is to be carried out, an optional float bias state is added, one for each LEO satellite, as shown in FIG. 4, to account for the integer cycle ambiguity.

Discussion of Present Disclosure

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 6:
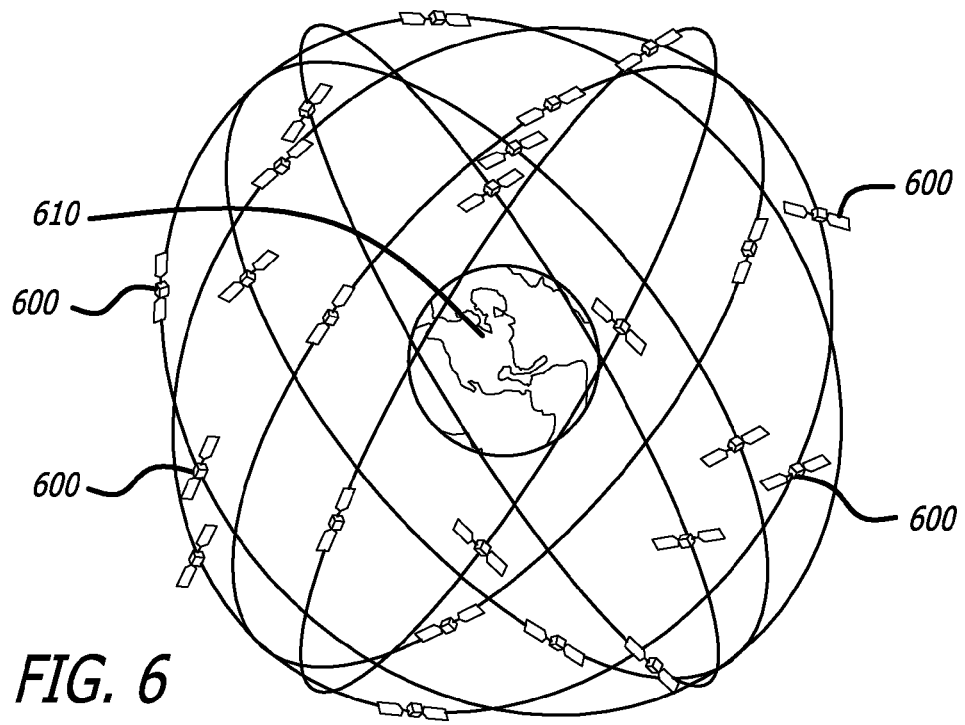
FIG. 6 is a schematic illustration of a plurality of space vehicles (SVs) orbiting the earth, in accordance with at least one embodiment of the present disclosure.

FIG. 6 illustrates a plurality of space vehicles (SVs) 600 orbiting the earth 610. The plurality of SVs 600 may include, but is not limited to, satellites, high-flying unmanned air vehicles (UAV), or any other suitable air vehicles. A user device on the earth may include an antenna and a computer system to receive signals from the plurality of SVs 600 and process the signals in order to determine a position of the user device. In some embodiments, the user device can include an output device; for example, a display to visualize the position and/or a connection bus to transfer position data to an external computer system.

In some embodiments, the signals can be modulated or pure carrier signals, while, in other embodiments, the signals can include position data of the SVs 600. In some embodiments, satellites of the global positioning system (GPS) can continuously transmit data signals including their position in space and time signals when the data signals have been sent. Time differences between the GPS satellites and the user device (i.e., the time it takes for the signal to travel from the GPS satellites to the user device) can be used to calculate the position of the user device with respect to each GPS satellite. Consequently, the user device's position on the earth can be determined according to a reference frame. In some embodiments, the reference frame can be the earth centered earth fixed (ECEF) coordinate system.

Figure 7:
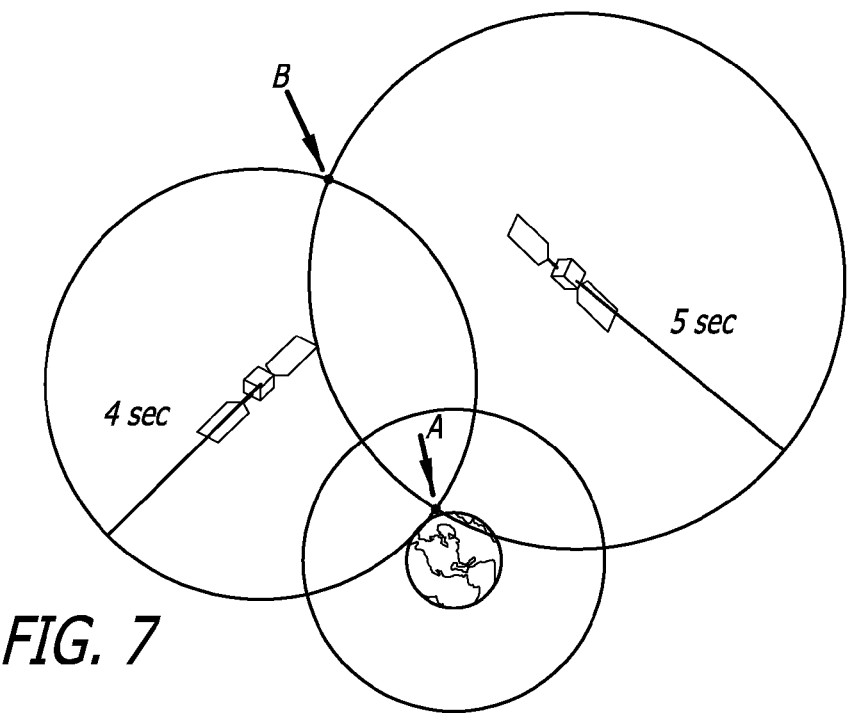
FIG. 7 is a schematic illustration of how a position A can be calculated from signals of the plurality of SVs of FIG. 6, in accordance with at least one embodiment of the present disclosure.
Figure 8:
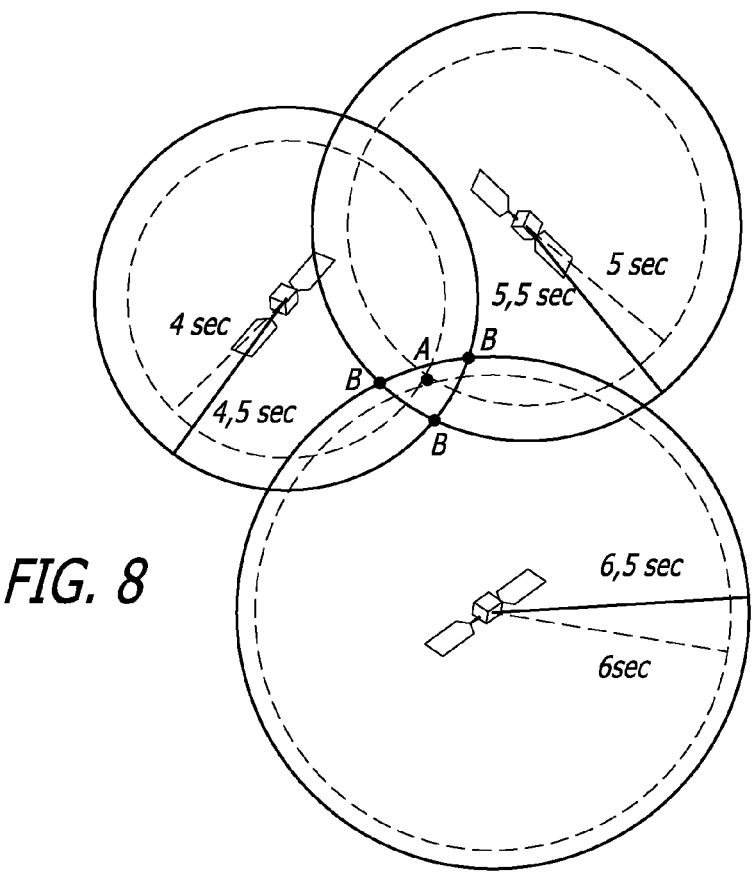
FIG. 8 is a schematic illustration of how time inaccuracies can influence the accuracy of the calculated position of FIG. 7, in accordance with at least one embodiment of the present disclosure.
Figure 9:
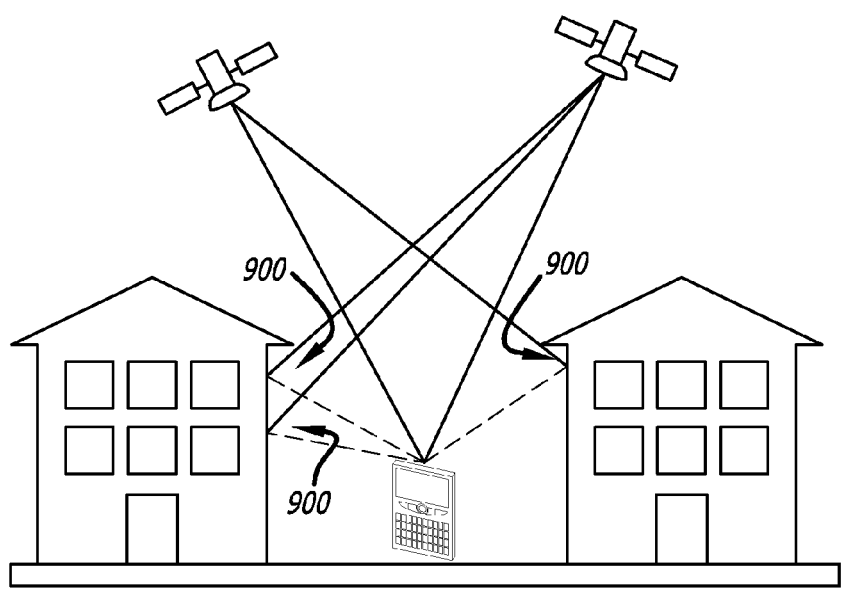
FIG. 9 is a schematic illustration of the signals of FIG. 7 being reflected by buildings, in accordance with at least one embodiment of the present disclosure.
Figure 10:
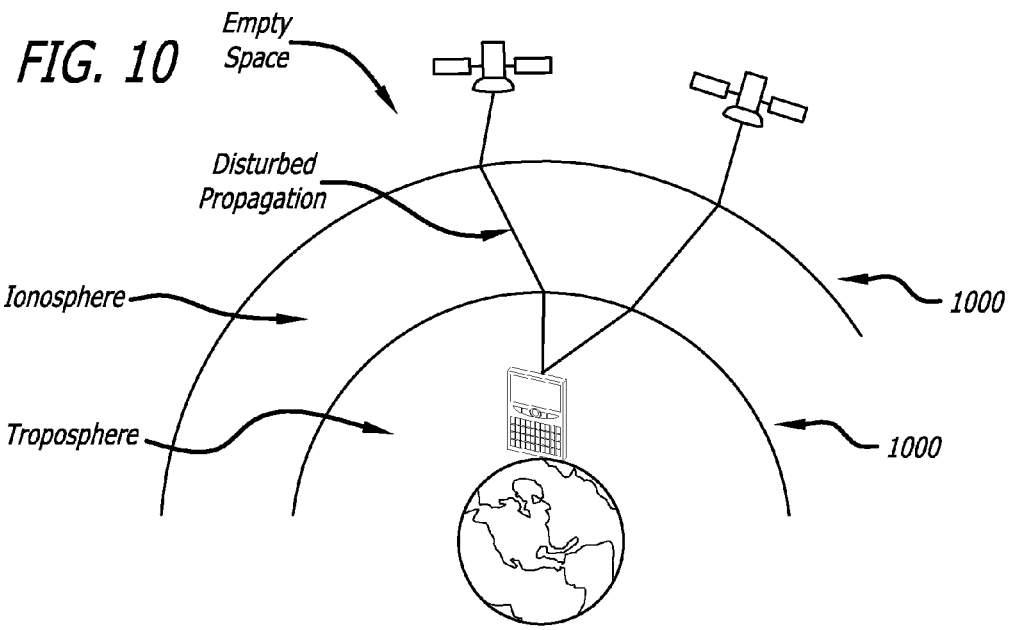
FIG. 10 is a schematic illustration of atmospheric influences on the signals of FIG. 7, in accordance with at least one embodiment of the present disclosure.

In some embodiments, the accuracy of the computed position of the user device on the earth can depend on the accuracy of the time signal. As shown in FIG. 7, if the time signals of the user device and the GPS satellites are perfectly synchronized, the user device is capable of determining the travel time of the signals and an exact location A. If the time signals of the user device and the GPS satellites are only slightly offset, as shown in FIG. 8, the position of the user device can be estimated within a certain range, which is denoted by the triangle defined by points B. Unsynchronized time signals can also result from reflections of the signals 900, as shown in FIG. 9, and/or atmospheric/weather conditions 1000, as shown in FIG. 10.

In some embodiments, the user device can process carrier signals from LEO satellites to determine the position of the user device. In some embodiments, the LEO satellites are communication satellites, such as those used in the Iridium system. In some embodiments, the LEO satellites can transmit at a higher intensity than the GPS satellites. As a result, the carrier signals can be received by the user device, even if signals from the GPS satellites become unavailable.

In some embodiments, the position of the user device can be determined from carrier signals of the SVs using a snapshot calculation. The user device can process the carrier signals to obtain carrier phase information. The carrier phase information can include a phase signal, an average slope of the phase signal, a time bias, and a frequency bias. In some embodiments, the carrier phase information can be obtained from an iterative process. The carrier signals can be sampled periodically and/or continuously. In some embodiments, a correlation time of the carrier signals of about ten seconds can suffice to obtain reliable carrier phase information. The snapshot calculation can use the carrier phase information to compute the current position of the user device.

If the carrier signals from the SVs become unavailable, an earlier position can be used to estimate the position of the user device, also called track maintenance. In some embodiments, the track maintenance can be used to extrapolate an estimate for a future position from a current position. The track maintenance can include an extended Kalman filter (EKF) state estimator. The EKF state estimator can model a dynamic evolution of a random process (i.e., arbitrary movements of the user device). In some embodiments, the EKF state estimator can include a velocity of the user device. In some embodiments, the velocity of the user device can be a ground velocity, while in other embodiments the velocity can include velocities faster than the speed of sound. In some embodiments, the EKF state estimator can include an inertial system if the velocity of the user device is greater than the speed of sound. The EKF state estimator can reliably predict a position of the user device if a positioning calculation cannot be performed.

The track maintenance of some embodiments can take a state of the user device into account. In one embodiment, the state of the user device can include a position of the user device, a velocity of the user device, a time bias of the user device, and/or a frequency bias of the user device.

Figure 11:
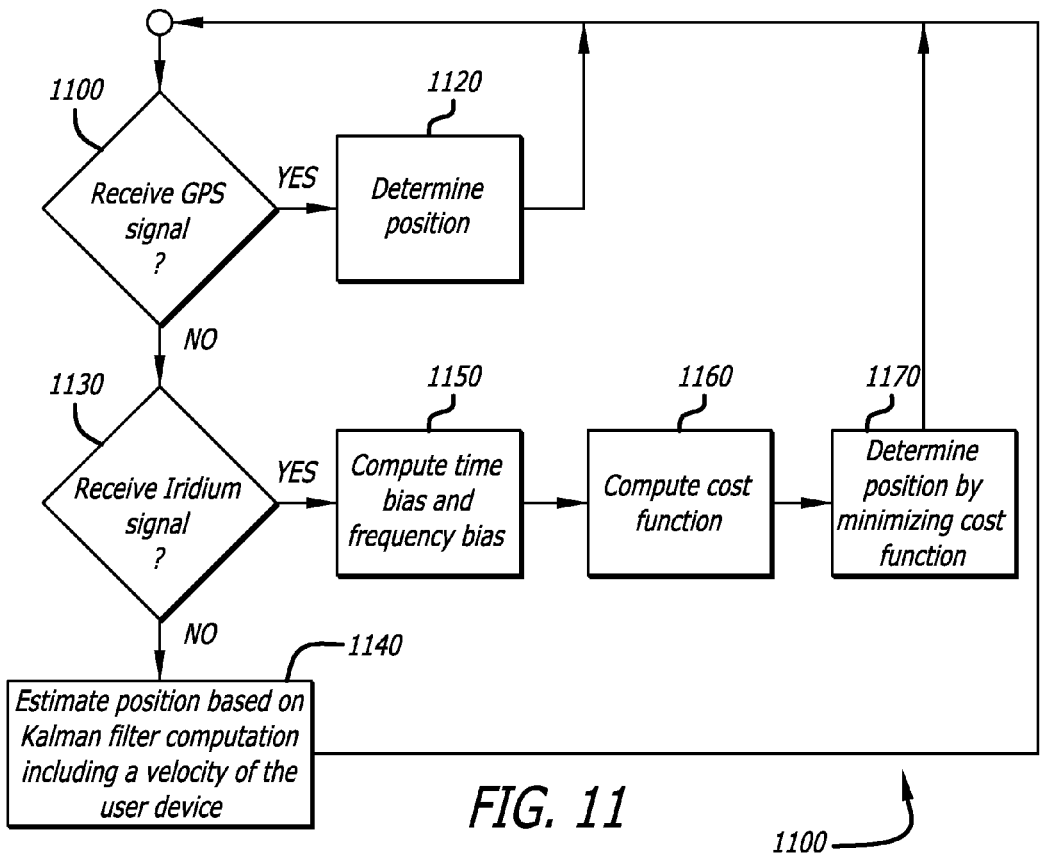
FIG. 11 is a flow chart of a process to determine a position of the user device according to one embodiment of the present disclosure.

In some embodiments, a hierarchy of different methods to determine the position of the user device can be employed. The hierarchy can include a method using signals from GPS satellites, a method using signals from SVs other than GPS satellites, and/or a method for track maintenance. FIG. 11 illustrates a flow chart 1100 of the process to determine the position of the user device according to one embodiment of the invention. In some embodiments, the hierarchy of the positioning methods can be specific to an application or a mission of the user device. In FIG. 11, it is first determined whether a GPS signal is received 1110. If a GPS signal is received, then the position of the user device is determined 1120. However, if a GPS signal is not received, then it is determined if an Iridium signal is received 1130.

If an Iridium signal is not received, then the position of the user device is estimated based on Kalman filter computation, which includes a velocity of the user device 1140. However, if an Iridium signal is received, then the time bias and frequency bias are computed 1150. After the time bias and frequency bias are computed, the cost function, which is a measure of the expected measurement error as a function of the estimated position, is then computed 1160. And, after the cost function is computed, the position of the user device is determined by minimizing the cost function 1170.

Figure 12:
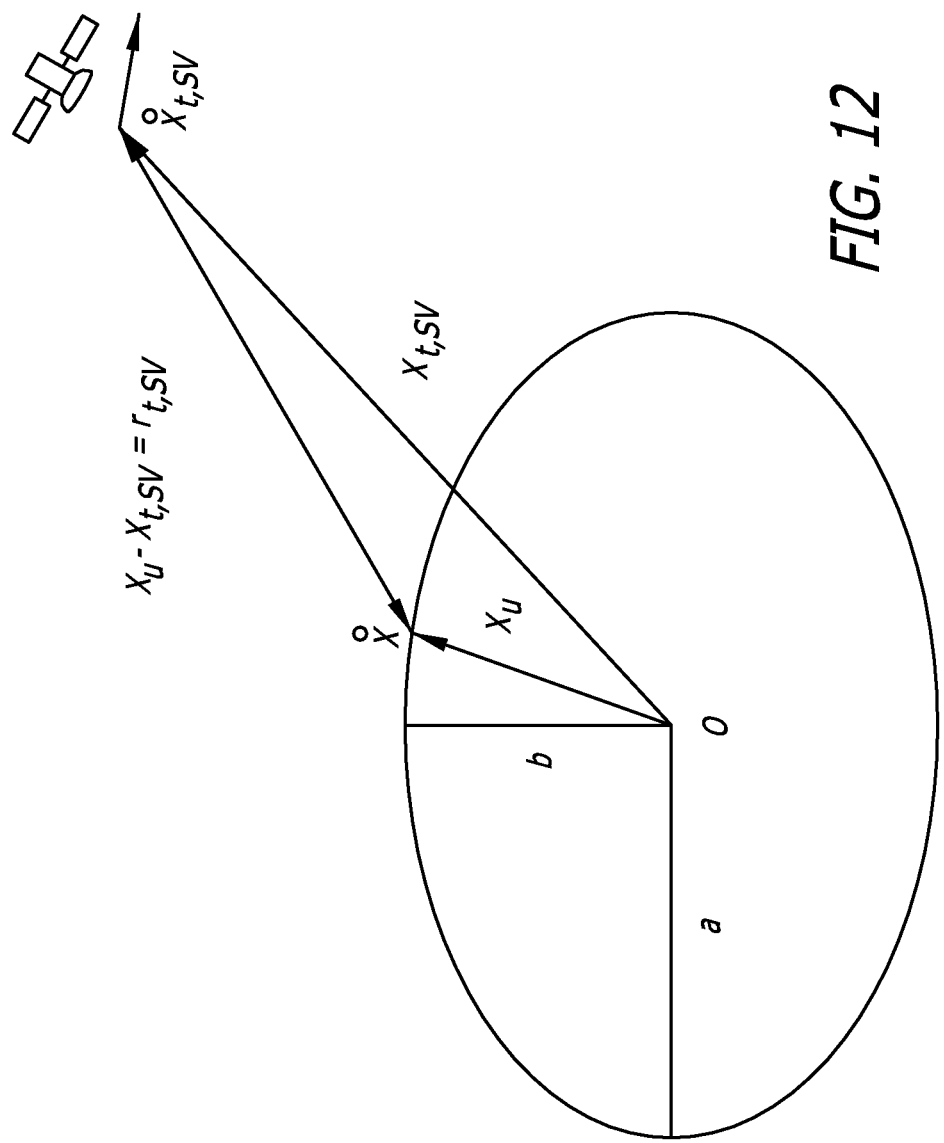
FIG. 12 is a schematic illustration of a signal transfer between a user device and a space vehicle (SV), in accordance with at least one embodiment of the present disclosure.

FIG. 12 illustrates a signal transfer between the user device and a distinct SV. FIG. 12 can be used to explain the snapshot calculations. A vector $X_u$ can point from an origin O to the user device $\dot{X}$, which can be also called a receiver. During a known transmission time t, the SV can be located at a position, which can be described by the vector $X_{t,SV}$. The SV can send a signal to the user device $\dot{X}$ so that the user device can uniquely identify the SV. The distance between the user device and the SV during the known transmission time t can be called range $r_{t,SV}$. The range $r_{t,SV}$ can be regarded as the length of the difference between the vector $X_u$ and the vector $X_{t,SV}$. During the known transmission time, the SV can travel at a speed $\dot{X}_{t,SV}$ so that a range rate $\dot{r}_{t,SV}$ can be defined as $$\dot{r}_{t,SV} \triangleq -\dot{X}_{t,SV}^T \frac{X_u - X_{t,SV}}{r_{t,SV}}.$$

The accuracy of the range $r_{t,SV}$ and the range rate $\dot{r}_{t,SV}$ can be compromised by a number of influences. In some embodiments, the method to compute the position of the user device can include a time bias $b_{t,u}$, a frequency bias $\dot{b}_{t,u}$, and random measurement errors $\epsilon_t, \eta_t$. The time bias $b_{t,u}$ can be regarded as a time drift and the frequency bias $\dot{b}_{t,u}$ can be regarded as a frequency offset. A pseudo range $\rho_{t,SV}$ and a pseudo range rate $\dot{\rho}_{t,SV}$ can be defined for each SV as follows:

$$\rho_{t,SV} = r_{t,SV}(X_u) + b_{t,u} + \epsilon_t,$$

$$\dot{\rho}_{t,SV} = \dot{r}_{t,SV}(X_u) + \dot{b}_{t,u} + \eta_t,$$

wherein the random measurement errors $\epsilon_t, \eta_t$ can be specific to the user device and the SV.

The time bias $b_{t,u}$ can be approximated by a polynomial in time defined by $$b_{t,u} \triangleq \sum_{n=0}^{N} q_n t^n / n!.$$

The order of the polynomial N can be any integer number. In some embodiments, the order to the polynomial can be governed by the available compute power of the user device. The coefficients $q_n$ of the polynomial can be independent of time. In some embodiments, the coefficients $q_n$ of the polynomial can be constant. The frequency bias $\dot{b}_{t,u}$ can be a derivative of the time bias $b_{t,u}$ with respect to time resulting $$\text{in } \dot{b}_{t,u} \triangleq \sum_{n=1}^{N} q_n t^{n-1}/(n-1)!.$$

A nonlinear least squares method can be employed to estimate the pseudo range $\rho_{t,SV}$ and the pseudo range rate $\dot{\rho}_{t,SV}$ by minimizing a cost function $J_{cost}$, which can be defined as:

$$J_{cost} \triangleq \frac{1}{2} \sum [Z_{t,SV} - W_{t,SV} - \Psi_t q_u]^T R_{t,SV}^{-1} [Z_{t,SV} - W_{t,SV} - \Psi_t q_u],$$

with $$Z_{t,SV} = \begin{bmatrix} \rho_{t,SV} \\ \dot{\rho}_{t,SV} \end{bmatrix},$$

$$W_{t,SV} = \begin{bmatrix} r_{t,SV} \\ \dot{r}_{t,SV} \end{bmatrix},$$

$$\Psi_t = \begin{bmatrix} 1 & t & \dots & t^N/N! \\ 0 & 1 & \dots & t^{N-1}/(N-1)! \end{bmatrix},$$

$$q_u = [q_o \ q_1 \ \dots \ q_N]^T,$$

and $R_{t,SV}$ being a measurement error covariance matrix or other weighting matrix.

In some embodiments, a linear least squares method can be employed to estimate the time bias $b_{t,u}$ and the frequency bias $\dot{b}_{t,u}$. The estimate for the time bias can be labeled $\overline{b}_{t,u}$ and the estimate for the frequency bias can be labeled $\overline{\dot{b}}_{t,u}$. To calculate the estimates, the cost function $J_{cost}$ can be reduced to two dimensions, latitude and longitude, because the coefficients $q_n$ are linearly dependent on the pseudo range $\rho_{t,SV}$ and the pseudo range rate $\dot{\rho}_{t,SV}$.

For reducing the order of the cost function $J_{cost}$ to two dimensions, a linear least squares sub-problem can be solved. To this end, the vector $q_u$ containing the coefficients $q_n$ can be re-written as:

$$q_u \triangleq q_z - q_w,$$

wherein $$q_z \triangleq \left( \sum_{\tau, SV} \Psi_\tau^T R_{\tau,SV}^{-1} \Psi_\tau \right)^{-1} \left( \sum_{\tau, SV} \Psi_\tau^T R_{\tau,SV}^{-1} Z_{\tau,SV} \right)$$

and $$q_w \triangleq \left( \sum_{\tau, SV} \Psi_\tau^T R_{\tau,SV}^{-1} \Psi_\tau \right)^{-1} \left( \sum_{\tau, SV} \Psi_\tau^T R_{\tau,SV}^{-1} W_{\tau,SV} \right).$$

Replacing the vector q, in the cost function $J_{cost}$ yields in a reduced order cost function $\tilde{J}_{cost}$ in term of measurements $\tilde{Z}$, model residuals $\tilde{W}$, and the error covariance matrix $\tilde{R}$ correlating the variances of $\tilde{Z}$. The bias and bias rate estimates are then recovered as $$\begin{bmatrix} \overline{b}_{t,u} & (X_u) \\ \overline{\dot{b}}_{t,u} & (X_u) \end{bmatrix} = \tilde{Z}_t - \tilde{W}_t,$$

with $\tilde{Z}_t \triangleq \Psi_t q_z$ and $\tilde{W}_t \triangleq \Psi_t q_w$. In some embodiments, the reduction of order of the cost function $J_{cost}$ can save a substantial amount of computation time.

Neglecting altitude, the position of the user device $X_u$ can be a function of latitude $y_1$ and longitude $y_2$ alone:

$$X_u = N(y_1) \begin{bmatrix} \cos(y_1)\cos(y_2) \\ \cos(y_1)\sin(y_2) \\ (b/a)^2 \sin(y_1) \end{bmatrix},$$

with $$N(y_1) \triangleq \frac{a}{\sqrt{1 - (1 - (b/a)^2)\sin^2(y_1)}},$$

a being the major axis of the earth ellipsoid and b being the minor axis of the earth ellipsoid according to the WGS-84 earth surface model (see FIG. 12).

In some embodiments, the latitude $y_1$ and the longitude $y_2$ can be evaluated with an iterative method, like a Newton Raphson, by solving $y_{k+1} = y_k - D_k(y_k) \nabla \tilde{J}_{cost}(y_k)$, with y being a vector having $y_1$ and $y_2$ as components, k being an iteration step, $D_k$ being a gradient deflection matrix and $\nabla \tilde{J}_{cost}$ being the gradient of the reduced order cost function $\tilde{J}_{cost}$.

The gradient deflection matrix $D_k$ can be the inverse Hessian of the reduced order cost function $$\tilde{J}_{cost}, \ D_k(y_k) = \left[ \frac{\partial^2}{\partial^2 y} \tilde{J}_{cost}(y) \right]_{y=y_k}^{-1},$$

which can be required to be evaluated at each iterative step k. As a result, the evaluation of $D_k$ can be computationally intensive.

Figure 13:
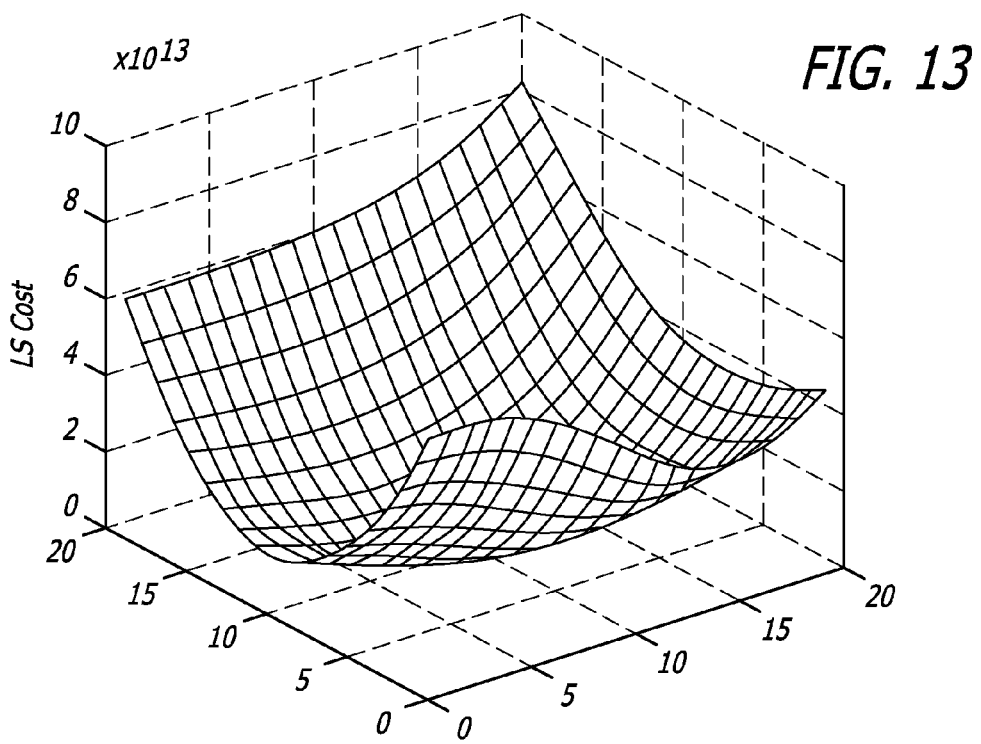
FIG. 13 is a contour plot of a cost function obtained from signals of three SVs, in accordance with at least one embodiment of the present disclosure.
Figure 14:
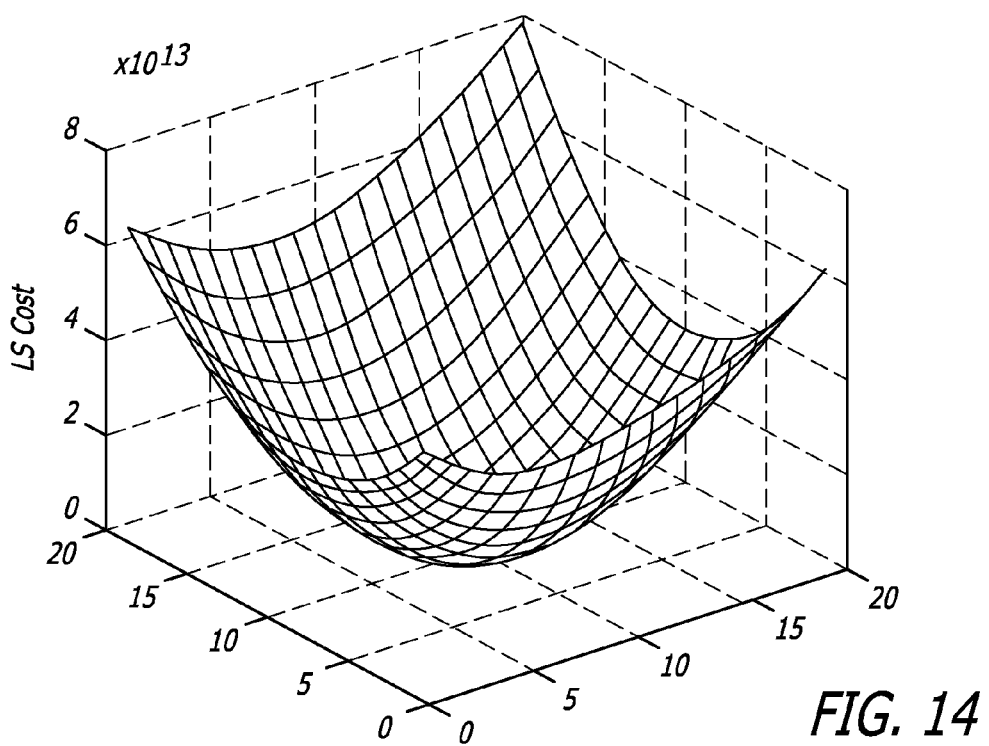
FIG. 14 is a contour plot of a cost function obtained from signals of four SVs, in accordance with at least one embodiment of the present disclosure.

FIGS. 13 and 14 illustrates surface plots of the reduced order cost function $\tilde{J}_{cost}$ computed with signals from three different SVs and four different SVs, respectively. Because the surfaces are well behaved, the gradient deflection matrix of some embodiments can be approximated by $$D_k(y_k) \triangleq \left[ \sum_{t,sv} \frac{\partial \tilde{W}_{t,sv}^T(X_u(y))}{\partial y} \tilde{R}_{t,sv}^{-1} \frac{\partial \tilde{W}_{t,sv}(X_u(y))}{\partial y^T} \right]_{y=y_k}^{-1}$$

involving only first-order derivatives with respect to y. As a result, the computation time for the snapshot calculation can be significantly reduced.

The iterative step can be initialized with a first guess of the position of the user device. In some embodiments, a weighted average of one or more SV beam positions projected onto the earth can be used as the initial guess, while in other embodiments, a weighted average of one or more SV positions projected onto the earth can serve as the initial guess. Once the iterative step converges with a desired accuracy, the snapshot calculation can be completed resulting in an (instantaneous) position X, of the user device along with estimates of the time and frequency biases.

To predict and/or estimate a position of the user device, the EKF state estimator can track the (changing) position of the user device. A state vector $x_t$ for the user device can be defined as $x_t \triangleq [X_{t,u}, \dot{X}_{t,u}, b_{t,u}, \dot{b}_{t,u}]^T$, with $X_{t,u}$ being the position $X_u$ at time instance t, $\dot{X}_{t,u}$ being the velocity of the user device at time instance t, and $b_{t,u}$ and $\dot{b}_{t,u}$ defined as above for the snapshot calculation. In some embodiments, the EKF state estimator can track a plurality of user devices simultaneously.

In some embodiments, the EKF state estimator can include four distinct sub-steps, a state extrapolation step, a covariance extrapolation step, a state update step and covariance update step. The state vector itself $x_t$, can be modeled as a random process according to the equation $x_t = \Phi_{t,\tau} x_\tau + \xi_\tau$, wherein $\Phi_{t,\tau}$ is a state transition matrix $\xi_\tau$ and is the process noise with covariance $Q_{t,\tau}$.

The covariance matrix $Q_{t,\tau}$ can be used to tune the EKF state estimator to achieve good agreement. The covariance matrix $Q_{t,\tau}$ can be regarded as a process noise or diffusion matrix. Because the state vector $x_t$ accounts for a position and a velocity of the user device, a neglected acceleration of the user device can be compensated in the covariance matrix $Q_{t,\tau}$. In some embodiments, the covariance matrix $Q_{t,\tau}$ can be defined as:

$$Q_{t,\tau} = \begin{bmatrix} \Gamma(t-\tau)^3/3 & \Gamma(t-\tau)^2/2 & 0_{3\times 1} & 0_{3\times 1} \\ \Gamma(t-\tau)^2/2 & \Gamma(t-\tau) & 0_{3\times 1} & 0_{3\times 1} \\ 0_{1\times 3} & 0_{1\times 3} & \sigma_d^2(t-\tau)^3/3 & \sigma_d^2(t-\tau)^2/2 \\ 0_{1\times 3} & 0_{1\times 3} & \sigma_d^2(t-\tau)^2/2 & \sigma_d^2(t-\tau) \end{bmatrix},$$

with $$\Gamma = [u_1 u_2 u_3] \Lambda [u_1 u_2 u_3]^T, \quad \Lambda = 2\tau_m \begin{bmatrix} \sigma_{xy}^2 & 0 & 0 \\ 0 & \sigma_{xy}^2 & 0 \\ 0 & 0 & \sigma_z^2 \end{bmatrix},$$

$u_i$ being unit vectors, $\tau_m$ being a maneuver time constant, $\sigma_d$ being an uncertainty in the bias acceleration, $\sigma_{xy}$ being a planar maneuver uncertainty, and $\sigma_z$ being a vertical maneuver uncertainty.

The unit vectors $[u_1 \ u_2 \ u_3]$ can be oriented to a local tangent plane centered at the estimate of the position of the user device $X_{t,u}$. In some embodiments, the unit vectors $u_i$ can be evaluated at the initial position estimate computed by the snapshot calculation and remain constant throughout the track maintenance. In some embodiments, a component of the covariance matrix $Q_{t,\tau}$ and/or the uncertainties $\sigma_i$ can be empirically determined.

Continuing with the state extrapolation step, the state transition matrix $\Phi_{t,\tau}$ can be defined in some embodiments as $$\Phi_{t,\tau} \triangleq \begin{bmatrix} I_{3\times 3} & (t-\tau)I_{3\times 3} & 0_{3\times 3} & 0_{3\times 3} \\ 0_{3\times 3} & I_{3\times 3} & 0_{3\times 3} & 0_{3\times 3} \\ 0 & 0 & 1 & (t-\tau) \\ 0 & 0 & 0 & 1 \end{bmatrix},$$

wherein I is the identity matrix and $(t-\tau)$ is an extrapolation time interval. In some embodiments, the state transition matrix $\Phi_{t,\tau}$ can be modeled as a linear prediction for the state vector $x_t$.

In some embodiments, the measurement model can be substantially identical to the model described with respect to the snapshot calculation above, i.e., $Z_{t,SV}$. A measurement vector $z_t$ can be defined as $$z_t = \begin{bmatrix} \rho_{t,u,SV} \\ \dot{\rho}_{t,u,SV} \end{bmatrix} = h(x_1) + \eta_t,$$

wherein $$h(x_t) \triangleq \begin{bmatrix} r_{t,u,sv} + b_{t,u} \\ \dot{r}_{t,u,sv} + \dot{b}_{t,u} \end{bmatrix}$$

is a function which estimates the predicted measurement based only on the present state estimate. In the previous expression, $r_{t,u,sv}$, $\dot{r}_{t,u,sv}$ are the estimated range and range rate between the user and the SV and $\eta_t$ is the measurement noise with covariance $R_t$.

For the covariance extrapolation step, a prediction $\hat{x}_t^-$ of the state vector $x_t$ can be computed with $\hat{x}_t^- = \Phi_{t,\tau} \hat{x}_\tau^-$. A prediction for the covariance matrix $P_t$ for the state vector $x_t$ can be evaluated by $P_t^- = \Phi_{t,\tau} P_\tau^- \Phi_{t,\tau}^T + Q_{t,\tau}$. In the above equations, the superscript '−' denotes that the estimates of $x_t$ and $P_t$ have not been updated by the most recent measurement value. The covariance update step (denoted by the superscript '+') can use this data to compute a new estimate $\hat{x}_t^+$ for the state vector $x_t$. The new estimate $\hat{x}_t^+$ can be computed with $\hat{x}_t^+ = \hat{x}_t^- + P_t^- H^T(\hat{x}_t^-)(H(\hat{x}_t^-)P_t^- H^T(\hat{x}_t^-) + R_t)^{-1} (z_t - h(\hat{x}_t^-))$. The covariance matrix $P_t$ can be updated with $P_t^+ = P_t^- - P_t^- H^T(\hat{x}_t^-)(H(\hat{x}_t^-)P_t^- H^T(\hat{x}_t^-) + R_t)^{-1} H(\hat{x}_t^-)P_t^-$, with $H(x_t)$ being the Jacobian matrix of $h(x_t)$. The Jacobian matrix $H(x_t)$ can be calculated with $$H(x_t) \triangleq \begin{bmatrix} s_{t,u,sv}^T & 0_{1\times 3} & 1 & 0 \\ (d\dot{X}_{t,u,sv} - \dot{r}_{t,u,sv} s_{t,u,sv})^T & s_{t,u,sv}^T & 0 & 1 \end{bmatrix},$$

wherein $s_{t,u,sv} \triangleq dX_{t,u,sv}/r_{t,u,sv}$ is a unit vector pointing from the SV to the user device, $d\dot{X}_{t,u,sv} \triangleq (\dot{X}_{t,u} - \dot{X}_{t,sv})$ is a relative velocity between the user device and the SV, and $\dot{r}_{t,u,sv} \triangleq d\dot{X}_{t,u,sv}^T s_{t,u,sv}$ is the range rate from the SV to the user device.

In some embodiments, the covariance extrapolation step and the covariance update step can be regarded as a predictor-corrector step method for the state vector $x_t$ and the covariance matrix $P_t$. To compute the state vector $x_t$ of the user device, the EKF state estimator of some embodiments can use different extrapolation time intervals. In some embodiments, the correlation time of a few seconds can suffice to obtain accurate results for the state vector $x_t$.

In some embodiments, the track maintenance can give reliable results in occluded environments. Types of occluded environments can include environments in which signals from other positioning systems are jammed or otherwise unavailable. In some embodiments, the occluded environments can include indoor environments, like buildings, basements, tunnels, caves, and undersea locations. In some embodiments, the accuracies of the snapshot calculations obtained for an Iridium system can be about 1,200 meters for three SVs and an occluded environment, 400 meters for four SVs and an occluded environment, and 32 meters for four SVs and a clean environment.

Different objects and advantages of the disclosure are described. It is understood that not necessarily all such objects or advantages may be achieved in accordance with any particular example of the disclosure. Those skilled in the art will recognize that the disclosure may be embodied or carried out in a manner that achieves or optimizes one advantage or group of advantages as taught herein without necessarily achieving other objects or advantages as may be taught or suggested.

While the method and system have been described in terms of what are presently considered to be the most practical and preferred examples, it is to be understood that the disclosure need not be limited to the disclosed examples. It is intended to cover various modifications and similar arrangements included within the spirit and scope of the claims, the scope of which should be accorded the broadest interpretation so as to encompass all such modifications and similar structures. The present disclosure includes any and all examples of the following claims.

We claim:

1. A method for track maintenance of a user device comprising:
    receiving a signal from at least one space vehicle;
    obtaining a position of the user device based on the received signal;
    applying an extended Kalman filter state estimator including the position of the user device and a velocity of the user device; and
    obtaining an estimate of a state of the user device for the track maintenance,
    wherein obtaining the position of the user device includes a snapshot calculation, and
    wherein performing at least one of the snapshot calculation and the extended Kalman filter state estimator includes a pseudo range measurement model and a pseudo range rate measurement model.

2. The method of claim 1, wherein computing the pseudo range measurement model and the pseudo range rate measurement model includes a nonlinear least squares method.

3. The method of claim 1, wherein performing at least one of the snapshot calculation and the extended Kalman filter state estimator includes a time bias and a frequency bias.

4. The method of claim 3, wherein computing the time bias and the frequency bias includes a linear least squares method.

5. The method of claim 3, wherein computing the time bias includes approximating the time bias with a polynomial.

6. The method of claim 3, wherein computing the frequency bias includes taking a derivative of the time bias with respect to time.

7. The method of claim 3, wherein the time bias and the frequency bias are expressed as explicit functions of a position of the user device.

8. The method of claim 3, wherein expressions of the time bias and the frequency bias modify a nonlinear least squares cost function by removing the biases as independent states, thereby reducing the number of independent variables to those of a position of the user device alone.

9. The method of claim 1, wherein the signal is received from a low earth orbit (LEO) satellite.

10. The method of claim 9, wherein the LEO satellite is part of the Iridium system.

11. The method of claim 1, wherein the state of the user device includes a position of the user device, a velocity of the user device, a time bias, and a frequency bias.

12. The method of claim 1, wherein obtaining the estimate of the state of the user device includes evaluating a latitude and a longitude of the position of the user device.

* * * * *